Figure 1:
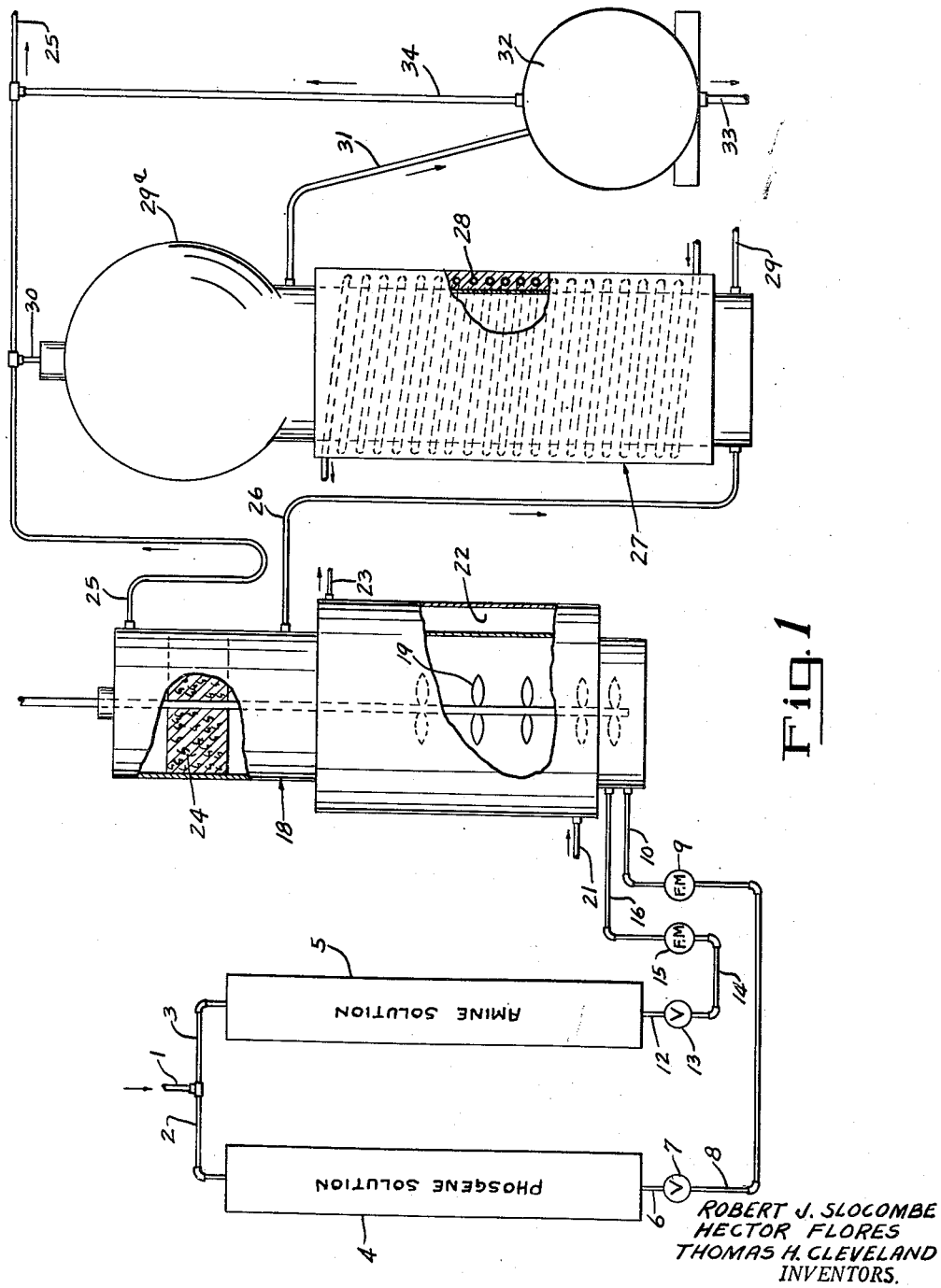

June 1, 1954  R. J. SLOCOMBE ET AL  2,680,127
METHOD OF MAKING ORGANIC ISOCYANATES
Filed Jan. 2, 1952  2 Sheets-Sheet 1

ROBERT J. SLOCOMBE
HECTOR FLORES
THOMAS H. CLEVELAND
INVENTORS.

BY Elmer P. Rucker

ATTORNEY

June 1, 1954

R. J. SLOCOMBE ET AL 2,680,127

METHOD OF MAKING ORGANIC ISOCYANATES

Filed Jan. 2, 1952

2 Sheets-Sheet 2

ROBERT J. SLOCOMBE
HECTOR FLORES
THOMAS H. CLEVELAND
INVENTORS.

BY Elmer P. Rucker

ATTORNEY

Patented June 1, 1954

2,680,127

UNITED STATES PATENT OFFICE 2,680,127

METHOD OF MAKING ORGANIC ISOCYANATES

Robert J. Slocombe, Dayton, Ohio, and Hector Flores and Thomas H. Cleveland, Anniston, Ala., assignors to Monsanto Chemical Company, St. Louis, Mo., a corporation of Delaware Application January 2, 1952, Serial No. 264,632

21 Claims. (Cl. 260—453)

The present invention relates to a novel method of preparing organic isocyanates.

One object of the invention is to provide an economically and commercially feasible liquid phase method of producing organic mono-, di- and polyisocyanates.

Another object of the invention is to provide a liquid phase method of producing organic mono-, di- and polyisocyanates which requires relatively simple equipment for large volume production.

Another object of the invention is to provide a liquid phase method of producing organic mono-, di- and polyisocyanates in which phosgene and primary amines or the corresponding hydrochlorides are reacted together under conditions resulting in substantially increased reaction and production rates over those obtainable by the prior art liquid phase methods.

An additional object of the invention is to provide a liquid phase method of producing organic mono-, di- and polyisocyanates in which the formation of polymers and other undesirable by-products are minimized.

A still further object of the invention is to provide a continuous liquid phase method of producing organic mono-, di- and polyisocyanates of excellent quality and in substantially improved yields over the liquid phase methods of the prior art.

Other objects and advantages will be apparent to those skilled in the art as the description of the invention proceeds.

Heretofore, organic mono-, di- and polyisocyanates have been produced in the liquid phase by reacting phosgene with primary amines or amine hydrochlorides to form the corresponding carbamyl chlorides, which are then converted into isocyanates by treatment with a base or by thermal decomposition.

For example, one liquid phase method which has been employed involves reacting primary amines with hydrogen chloride to form the corresponding salt, treating this salt while in the molten state with phosgene to produce the carbamyl chloride and then dehydrochlorinating the latter to yield the corresponding isocyanate. As an improvement of the foregoing method, it has been proposed to pass phosgene over the molten hydrochloride salt at a rate sufficient to remove hydrogen chloride as rapidly as it is formed in the reaction and thereby produce the isocyanate directly.

Another liquid phase method which has been practiced comprises adding hydrogen chloride to a solution of the corresponding amine in a suitable organic solvent and then treating the resulting slurry of amine hydrochloride at a temperature of 130° C. to 180° C. with phosgene to convert it into the corresponding isocyanate. The reactions involved in this method are represented by the following equations:

(a) $R(NH_2)_2 + 2HCl \longrightarrow R(NH_3Cl)_2$ (b) $R(NH_3Cl)_2 + 2COCl_2 \longrightarrow R(NHCOCl)_2 + 4HCl$ (c) $R(NHCOCl)_2 \xrightarrow{\Delta} R(NCO)_2 + 2HCl$ To avoid having to separately prepare the hydrochloride salt in the above manner, a modified procedure has been practiced which involves adding a solution of the amine to a solution of excess phosgene at 0° C. to 50° C. to bring about Reactions 1 and/or 2 as shown by the following equations:

(1) 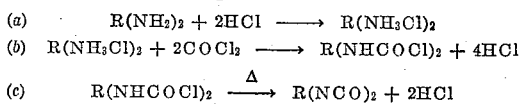

(2) 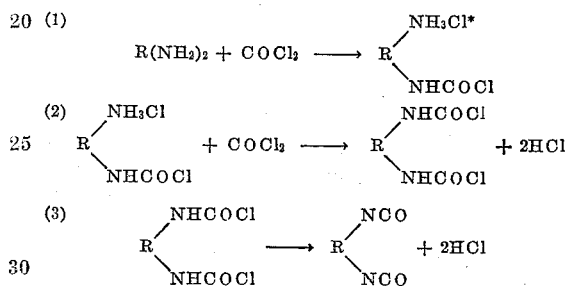

* Or a mixture of $R(NH_3Cl)_2$ and $R(NHCOCl)_2$ in the proportions equivalent to this product.

The slurry of intermediate thus obtained is heated to 130° C to 180° C. and reacted with phosgene to convert the products of Equations 1 and 2 into the corresponding diisocyanate in the manner indicated above. At the end of the reaction a stream of an inert gas is passed through the solution in order to remove excess hydrogen chloride and unreacted phosgene.

The above described liquid phase methods of preparing isocyanates have enjoyed substantial success, but they have a number of disadvantages which impair or discourage their use on a commercial scale.

One disadvantage of the liquid phase solvent methods of producing isocyanates as practiced by the prior art is that in the initial stage of the reaction of the amines and amine hydrochlorides with phosgene, a slurry of intermediate of poor physical properties is obtained. Thus, by the above methods, a slurry of intermediate characterized by large particle size, coarse texture, heterogeneous dispersion of solids and low mobility is obtained. Consequently, when this slurry is treated with additional quantities of phosgene, the conversion to the corresponding isocyanate takes place at an inordinately slow rate and with the formation of excessively large amounts of solid polymerized isocyanates and other undesirable by-products. This relatively slow conversion rate and formation of by-products has the undesirable effect of greatly lowering the overall production rate and of substantially reducing the yield of the desired product.

A further disadvantage of the foregoing methods is that in the case of organic di- and polyisocyanates it is necessary to use excessive amounts of solvent and phosgene to obtain optimum conversions and even then the yields of isocyanates are usually less than 60% of theory, based on the amine.

Another disadvantage of the liquid phase solvent and non-solvent methods of producing isocyanates as practiced by the prior art is that due to the fact that the reaction rate is very slow, it is necessary to use large and numerous pieces of equipment in order to achieve large volume production.

Now we have developed a relatively simple commercially and economically feasible method of producing organic mono-, di- and polyisocyanates which has none of the objectionable features mentioned above.

The foregoing method involves continuously reacting together, in the presence of an organic solvent, phosgene and a primary amine at a temperature substantially in the range of about minus 20° C. to about 60° C. The phosgene and amine are reacted together in substantially the proportions required to yield a slurry or solution of the intermediate or intermediates shown in Equations 1 and 2 supra.

The slurry or solution obtained in the above manner is continuously conveyed to a secondary reaction zone and reacted with phosgene in the presence of an organic solvent to convert the intermediate into the corresponding isocyanate, the reaction being carried out at a temperature of about 80° C. to about 320° C. and preferably at a temperature of about 130° C. to about 220° C.

The resulting crude isocyanate solution is then continuously conducted to another zone and treated with an inert gas, with or without heating, to remove the hydrogen chloride and unreacted phosgene, whereupon it is subjected to continuous distillation to separate the solvent and other impurities from the isocyanate.

For a more complete understanding of the present invention, reference is made to the accompanying drawings which show in conventional side elevation two particular embodiments of the invention. It should be emphasized, however, that modifications and variations in the equipment apparent to those skilled in the art may be made as desired without departing from the broad scope of the invention.

Referring to Figure 1 of the drawing, reference characters 1, 2, and 3 represent lines for introducing nitrogen or another inert gas under pressure into storage vessels 4 and 5 which contain organic solvent solutions of phosgene and an amine, respectively. The nitrogen pressure forces the phosgene solution via line 6, valve 7, line 8, flow meter 9, and line 10, and the amine solution by line 12, valve 13, line 14, flow meter 15, and line 16 into the bottom of primary column or pot reactor 18, where they are intimately mixed together by means of a suitable agitator 19 and reacted at a temperature within the range of about minus 20° C. to about 60° C. This reaction temperature is maintained by means of a cooling medium such as water or a brine solution which is introduced by line 21 into the jacket 22 of the primary reactor and is discharged therefrom by means of line 23.

The agitator 19 for the primary reactor extends through packing 24 and is connected with a suitable motor which is not shown.

The primary reactor 18 is provided with off-take lines 25 and 26 for discharging the off-gases and the crude intermediate reaction product, respectively. The off-gases in line 25 are conducted to a scrubber not shown where they are suitably treated to render them innocuous and the slurry or solution of crude intermediate reaction product is conveyed by line 26 into the bottom of the secondary column reactor 27 which is heated by means of a suitable heating coil 28.

The intermediate reaction product from the primary reaction zone is reacted in the secondary column reactor 27 with phosgene which is introduced by line 29 to form the corresponding isocyanate and hydrogen chloride, the reaction taking place at a temperature substantially in the range of about 80° C. to about 230° C.

The secondary column reactor 27 is also provided with a gas disengaging space 29a, which permits the hydrogen chloride and unreacted phosgene to separate from the foaming mass of crude isocyanate and flow by lines 30 and 25 to the scrubber. The separated isocyanate falls back into the more constricted portion of the secondary column reactor 27 and eventually flows by line 31 into an isocyanate storage tank 32, from which it is withdrawn by line 33 for purification in a manner hereinafter described. The crude isocyanate tank 32 is provided with line 34 for conveying off-gases to line 25 leading to the scrubber mentioned above.

In practicing the invention in the above system, the reactant solutions are continuously fed to the primary column reactor and reacted to form a slurry or solution of an intermediate which may consist of carbamyl chlorides or a mixture thereof with amine hydrochlorides depending upon the amine used and the phosgene/amine molar ratio. The slurry or solution thus produced is continuously conveyed to the secondary reactor where it is continuously reacted with phosgene gas to produce the corresponding isocyanate which continuously overflows into the isocyanate storage tank.

The crude isocyanate is continuously withdrawn to another vessel not shown where it is continuously treated with an inert gas such as nitrogen, natural gas, etc., while heating same to a temperature of about 100° C. to about 160° C. for about ½ to about 1 hour. This treatment continuously removes the last traces of unreacted phosgene and hydrogen chloride.

The degassed product is then continuously distilled under a suitable pressure and temperature to separate the isocyanate from the solvent.

Figure 2:
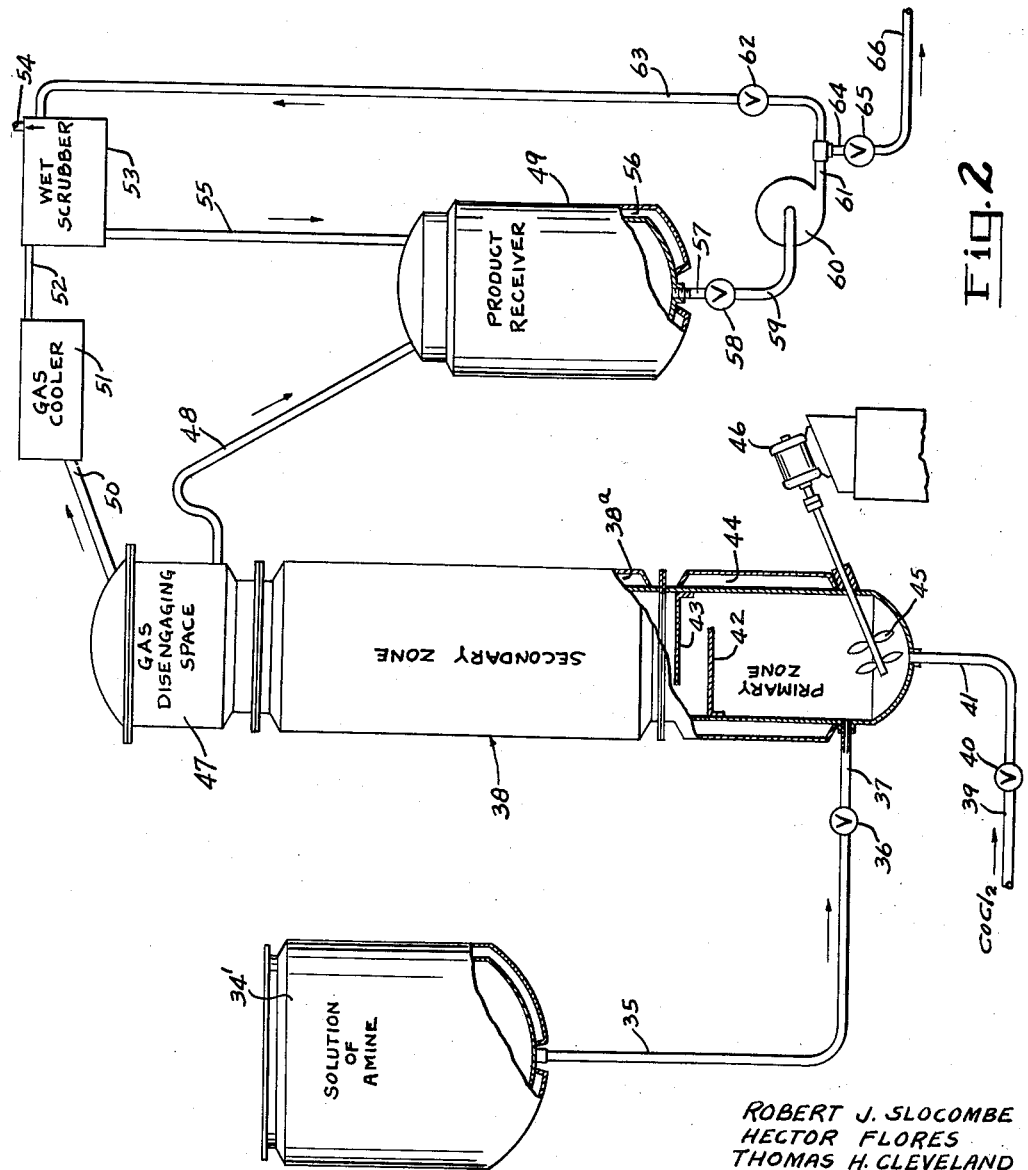

Referring to Figure 2, reference character 34' is a vessel containing a solution of an amine which is conveyed by line 35, valve 36 and line 37 into the primary reaction zone of column 38. Simultaneously with the last mentioned operation, gaseous phosgene is fed by way of line 39, valve 40 and line 41 into the primary reaction zone and reacted with the above amine solution to produce a slurry or solution of intermediate reaction product.

The primary reaction zone of the column 38 is provided with baffles 42 and 43 which separate it from the secondary reaction zone, and also with a jacket 44 containing a cooling fluid for maintaining the reaction temperature within the limits of about minus 20° C. to about 60° C. Moreover, the primary reaction zone is equipped with an agitator 45 operated by motor 46, which serves to effect intimate mixing of the reactants.

The secondary reaction zone of column 38 is equipped with a jacket 38a containing a heating fluid for heating the reactants to a temperature in the range of about 80° C. to about 230° C. This results in the substantially complete conversion of the intermediate from the primary reaction zone into the corresponding isocyanate.

The secondary reaction zone communicates with a gas disengaging space 47, which permits separation of the unreacted phosgene and hydrogen chloride from the crude solution of isocyanate. This gas disengaging space is provided with a discharge line 48 for conducting the crude isocyanate product into a product receiver 49 and an off-gas line 50 for conveying the off-gas into a gas cooler 51 where substantially all of the entrained isocyanate is removed.

The uncondensed gas from the cooler 51 flows by line 52 into a wet scrubber which is supplied with a suitable solvent by way of line 63. This solvent which is preferably a portion of the recycled crude isocyanate is used to scrub the uncondensed gas to remove the last traces of the isocyanate product. The scrubbing solvent thus enriched is discharged from the scrubber 53 by way of line 55 and is thus returned to the product receiver.

The product receiver 49 is provided with a jacket 56 containing a heating fluid for heating the contents of the receiver.

The crude isocyanate product in receiver 49 is conducted by way of line 57, valve 58 and line 59 into the intake side of pump 60 from which a portion of the crude product is pumped via line 61, valve 62, and line 63 back to the wet scrubber 53. The remainder of the crude product is then conveyed by way of line 64, valve 65, and line 66 to a suitable vessel (not shown) and heated to a temperature of about 110° C. to about 115° C. for 30–60 minutes while being treated with dry natural gas, methane, nitrogen or other suitable inert gas. The degassed product is then subjected to distillation to separate the solvent and other impurities from the isocyanate product.

The system shown in Figure 2 may be simplified, if desired, by eliminating pump 60, line 61, valve 62, line 63, line 54, wet scrubber 53, line 55, line 52, gas cooler 51, line 64, valve 65 and line 66.

In the practice of the invention in the system illustrated in Figure 2, the amine solution and gaseous phosgene are continuously charged into the primary reaction zone of the column reactor 38 and as this operation proceeds, the hydrostatic level in the reactor increases and the crude isocyanate product ultimately flows continuously over into the product receiver. A portion of the crude product is continuously recycled to scrub out isocyanate entrained by the off-gas from the tower and the remainder is continuously conveyed to a degasser unit (not shown) to remove traces of hydrogen chloride and unreacted phosgene. The degassed product is then continuously conducted to a still and distilled to separate the isocyanate from the solvent and other impurities and the off-gases from the wet scrubber are conducted via line 54 to a suitable tower and treated with caustic to render them innocuous.

EXAMPLE I

Meta-tolylene diisocyanate

The system illustrated in Figure 1 of the accompanying drawings was employed in practicing this embodiment of the invention.

A solution of meta-tolylene diamine in ortho-dichlorobenzene (TDA/orthene weight ratio=0.1) and a solution of phosgene in the same solvent were continuously introduced into the primary reactor at rates providing a phosgene/amine molar ratio of about 1.48. The ensuing reaction was carried out continuously for a period of about 360 minutes and at an average temperature of about 7° C. and resulted in the continuous production of a slurry of an intermediate which was conveyed to the secondary reactor.

In the secondary reactor, the slurry of intermediate was continuously reacted with gaseous phosgene at an average temperature of about 166° C. to yield a crude product containing m-tolylene diisocyanate. During this operation the slurry and phosgene were charged at rates providing a phosgene/amine molar ratio of about 1.49 and a sojourn time for the reactants and reaction product of about 35 minutes.

The crude isocyanate solution thus produced was transferred to a still and distilled to substantially completely remove the ortho-dichlorobenzene, the distillation being carried out at a temperature of about 65° C. to about 85° C. and at an absolute pressure of about 10–14 mm. of mercury. The distilled product was transferred to a pot, then mixed with a chlorinated mixture of isomeric terphenyls containing 42% chlorine and redistilled at a temperature of 93° C. to 105° C. and at a pressure of 3 to 5 mm. of mercury. The distillate thus obtained was substantially pure meta-tolylene diisocyanate in a yield corresponding to 68% of theory, basis meta-tolylene diamine.

EXAMPLE II

Meta-tolylene diisocyanate

The system employed in carrying out this embodiment of the invention was substantially identical with that illustrated in Figure 2 of the accompanying drawings, except that line 55, pump 60 and lines 61–66 inclusive were omitted.

A solution containing chlorinated biphenyl (42% Cl) and meta-tolylene diamine in the proportions of 1242 parts and 138 parts by weight respectively was continuously charged into the primary reaction zone and simultaneously therewith phosgene gas was introduced at a rate supplying the above reactants in a phosgene/meta-tolylene diamine molar ratio of about 3.26 to 1. These materials were continuously reacted together at a temperature within the range of about 44° C. to about 57° C. and the sojourn time of the reactants and product in the reaction zone was approximately 26 minutes.

The slurry of intermediate reaction product produced in the primary reaction zone was continuously conducted to the secondary reaction zone where further reaction with phosgene was effected with the result that the former was converted substantially completely into meta-tolylene diisocyanate. The reaction in the secondary reaction zone took place at a temperature substantially in the range of about 183° C. to about 190°

C. and the sojourn time of the reactants and product was approximately 52 minutes.

The crude meta-tolylene diisocyanate thus produced continuously passed up into the gas disengaging space as a foaming mass where the unreacted phosgene and hydrogen chloride were separated from the diisocyanate and passed to the gas cooler to separate any entrained diisocyanate. The gaseous residue was then continuously passed through a wet scrubber containing chlorinated biphenyl (42% Cl) to remove the last traces of diisocyanate, whereupon the off-gases were discharged from the system.

The crude liquid diisocyanate product separated in the gas disengaging space was continuously conducted to the product receiver from which it was withdrawn to a suitable vessel (not shown) and heated to about 110° C. to about 115° C., and then subjected to treatment with natural gas for about 45 minutes to eliminate the last traces of hydrogen chloride and unreacted phosgene. The resulting product was then distilled at a temperature of about 97° C. to about 120° C. while under a pressure of about 2-4 mm. of mercury to separate meta-tolylene diisocyanate from the crude product in a substantially pure form. This substantially pure product was recovered in a yield corresponding to 79% of theory, basis meta-tolylene diamine.

The systems illustrated in Figures 1 and 2 may also be employed in the continuous production of mono-, di- and polyisocyanates from the corresponding amine hydrochlorides. In such an arrangement, the primary reactor is eliminated and the amine hydrochloride slurry or solution and phosgene are continuously introduced into the secondary column reactor and reacted together in the same manner as that described above in connection with the second step of the two stage method of producing isocyanates from amines and phosgene.

In order to illustrate more clearly the foregoing embodiment of the invention reference is made to the following example.

EXAMPLE III

*Meta-tolylene diisocyanate*

A 10% solution of meta-tolylene diamine in chlorinated biphenyl (42% Cl) was converted into a slurry of the corresponding hydrochloride by means of hydrogen chloride. Thereupon, this slurry and gaseous phosgene were continuously introduced into the single column reactor used in Example II at feed rates supplying the above reactants in a phosgene to amine molar ratio of about 2.46. The ensuing reaction resulted in the formation of a crude solution of meta-tolylene diisocyanate, the reaction taking place at an average temperature of about 209° C. The sojourn time of the reactants and product in the reactor was approximately 99 minutes.

The crude solution of meta-tolylene diisocyanate was heated and treated with natural gas to eliminate hydrogen chloride and unreacted phosgene. The degassed solution was then fractionally distilled at a temperature of from about 86° C. to about 108° C. while under a pressure of about 1.5 to 3.5 mm. of Hg to separate the meta-tolylene diisocyanate from the solvent and other impurities. The meta-tolylene diisocyanate was recovered in a yield corresponding to 70.3% of theory, basis meta-tolylene diamine.

The various operating conditions of the method of the instant invention will now be discussed in detail.

The method of the instant invention is applicable to the production of aliphatic, cycloaliphatic, alkaryl, aralkyl, heterocyclic and aryl mono-, di- and polyisocyanates. Illustrative examples of these are hexyl isocyanate, octyl isocyanate, dodecyl isocyanate, octadecyl isocyanate, ethylene diisocyanate, propylene diisocyanate, tetramethylene diisocyanate, pentamethylene diisocyanate, octamethylene diisocyanate, undecamethylene diisocyanate, dodecamethylene diisocyanate, 3,3′ diisocyanate dipropylether, etc.; cyclohexyl isocyanate, tetrahydro-α naphthyl isocyanate, tetrahydro-β-naphthyl isocyanate, etc.; cyclopentylene 1,3-diisocyanate, cyclohexylene-1,4 diisocyanate, tolyl isocyanate, p-ethyl-phenyl isocyanate, ortho-tolylene diisocyanate, xylylene 1,4-diisocyanate, xylylenes, 1,3-diisocyanate, 4,4′ diphenylmethane diisocyanate, 4,4′ diphenyl propane diisocyanate, etc.; benzyl isocyanate, phenylethyl isocyanate, p-isocyanato benzyl isocyanate, etc.; phenyl isocyanate, p-cetyl phenyl isocyanate, p-dodecylphenyl isocyanate, 4-dodecyl-2-methylphenyl isocyanate, 3-nitro-4 dodecyl phenylisocyanate, p-cetyloxyphenyl isocyanate, metaphenylene diisocyanate, para-phenylene diisocyanate, 1-methyl phenylene-2,4-diisocyanate, naphthylene 1,4-diisocyanate, o,o′ tolylene diisocyanate, 1,2,4-benzene triisocyanate, etc.; furfuryl isocyanate and tetrahydrofurfuryl isocyanate, etc.

In the production of isocyanates in accordance with the present invention, the phosgene gas or solution and the primary amine solution are reacted together continuously in the primary reaction zone in a phosgene to amine molar ratio which may vary within the range of about 1.2 to about 3.2 or higher depending upon the number of amino groups present in the primary amine. Larger or smaller ratios are also within the scope of the invention but when smaller ratios are employed the theoretical requirements at least should be substantially met. Moreover, if only the theoretical amounts of reactants required to yield the intermediate reaction product are introduced into a single column reactor, provision is made for the introduction of more phosgene after the reaction mixture leaves the primary reaction zone.

The reaction in the primary reaction zone is carried out at a temperature substantially in the range of about −20° C. to about 60° C. and within these limits a temperature of about 30° C. to about 50° C. is preferred.

The sojourn time of the reactants and reaction product in the primary reaction zone generally varies within the range of about 5 to about 60 minutes. However, it is preferred to control the feed rates of the reactants so that the sojourn time will fall within the limits of about 20 to 30 minutes.

In executing the reaction in the secondary reaction zone, the reactants are reacted together in the proportions calculated to provide an overall phosgene/amine molecular ratio within the range of about 1 to about 3 or higher. Thus, the reactants in the secondary reaction zone may be employed in amounts supplying an overall phosgene/amine molar ratio of about 1, 2 and 3 in the case of mono-, di- and triisocyanates, respectively. This means that if in each of the above instances a molar ratio of less than 1 were used in the primary reaction, sufficient phosgene is added to the secondary reaction zone to bring the final phosgene/amine molar ratio up to the above values, respectively.

The reaction in the secondary reaction zone is effected at a temperature substantially in the range of about 80° C. to about 230° C. and within these limits a temperature of about 130° C. to about 220° C. is preferred when using a high boiling solvent as the reaction medium, whereas a temperature of from 80° C. to 170° C. or more specifically from 130° C. to 170° C. is preferred when using a low boiling solvent for the above purpose.

In general, the sojourn time of the reactants and reaction product in the secondary reaction zone falls within the limits of about 10 minutes to about 90 minutes and within these limits about 50 minutes is preferred.

The solvent used in the above described method should have a boiling point at atmospheric pressure of at least 75° C. and preferably about 130° C. to about 350° C. but a higher boiling solvent may be employed if desired. The solvent should not have a reactive hydrogen atom; it should be a good solvent for phosgene, amines and isocyanates, and a poor solvent for hydrogen chloride. In addition, the solvent should be stable under the reactive conditions of the method. Illustrative examples of suitable solvents are benzene, toluene, xylene, isopropylbenzene, dichlorobenzene, trichlorobenzene and relatively high boiling solvents such as partially hydrogenated terphenyls, and chlorinated biphenyls containing about 21% to about 62% by weight of chlorine. The partially hydrogenated terphenyls contemplated by the instant invention are disclosed and claimed in Patent 2,364,719 which is assigned to the same assignee as the instant application.

The reaction between phosgene and the slurry or solution of primary amine hydrochloride in an inert organic solvent is executed at a temperature substantially in the range of about 80° C. to about 250° C. or more specifically in the range of about 120° C. to about 250° C. and within these limits a temperature of about 150° C. to about 200° C. is preferred.

The above reactants are employed in a phosgene/amine hydrochloride ratio of about 1.2 to about 3.2 or higher depending upon the amino groups present in the primary amine. Larger or smaller ratios are also within the scope of the invention, but when using smaller ratios the theoretical requirements at least should be substantially met.

It is desired to point out that in each of the above modifications of applicants' invention, the degassing step is optional and may be omitted if desired.

In the case of the isocyanates boiling below about 120° C. at atmospheric pressure, the ultimate reaction products are either the corresponding carbamyl chloride or a mixture thereof with the corresponding isocyanate, in which case they must be subjected to decomposition to liberate hydrochloride in order to form the isocyanate. This may be accomplished by means of an inorganic base such as lime or a tertiary organic base such as pyridine, dimethyl aniline, etc. Examples of isocyanates of the above type are alkyl isocyanates having 1 to 6 carbon atoms.

It is desired to emphasize at this point the vital importance of preparing the primary reaction product in a continuous manner. If this is not done, the intermediate reaction product has poor physical properties which materially impair its use in the continuous secondary column reactor. For example, if the primary reaction is executed in a batchwise manner, the slurry of reaction product is characterized by relatively large particle size, coarse texture, heterogeneous dispersion of solids and low mobility, all of which bring about a decreased rate of reaction and an increased formation of solid by-products when the slurry is subjected to secondary phosgenation in the secondary column reactor. In contrast to batchwise operation, the continuous execution of the primary reaction results in the production of a slurry of very small and uniform particle size, fine texture, uniform dispersion of solids and high mobility which leads to a substantially increased rate of reaction and a substantial reduction in the formation of polymers and other undesirable by-products during the reaction with phosgene in the secondary column reactor.

The above description and examples are intended to be illustrative only. Any modification or variation therefrom which conforms to the spirit of the invention is intended to be included within the scope of the claims.

What we claim is:

1. The method of continuously producing mono-, di- and polyisocyanates, which comprises continuously supplying phosgene and a compound selected from the group consisting of primary mono-, di- and polyamine hydrochlorides to a reactor and therein continuously reacting said materials in the presence of an inert organic solvent to form the corresponding isocyanate, said reaction being carried out at a temperature within the range of about 80° C. to about 320° C., and said phosgene being employed in at least the theoretical amount required to convert said amine hydrochlorides into the corresponding mono-, di- and polyisocyanates, respectively.

2. The method of continuously producing mono-, di- and polyisocyanates in accordance with claim 1, wherein the primary amine hydrochloride is formed by reacting the corresponding amine with a compound selected from the group consisting of phosgene and hydrogene chloride.

3. The method of continuously producing mono-, di- and polyisocyanates, which comprises continuously supplying phosgene and an inert organic solvent solution of a compound selected from the group consisting of a primary mono-, di- and polyamine to a primary reaction zone and therein continuously reacting said phosgene and said amine at a temperature in the range of about −20° C. to about 60° C. to produce an intermediate reaction product and continuously reacting said product with phosgene in a secondary reactor at a temperature of about 80° C. to about 320° C. to form the corresponding isocyanate, said phosgene being employed in said primary reaction zone and said secondary column reactor in a total amount at least equivalent to that theoretically required to convert said primary amines into the corresponding mono-, di- and polyisocyanates, respectively.

4. The method of continuously producing mono-, di- and polyisocyanates, which comprises continuously reacting phosgene with an inert organic solvent solution of a compound selected from the group consisting of a primary mono-, di- and polyamine in a primary reaction zone at a temperature in the range of about −20° C. to about 60° C. to produce an intermediate reaction product and continuously reacting said product with phosgene in a secondary column reactor at a temperature of about 80° C. to about 320° C. to form the corresponding isocyanate, said phosgene being employed in said primary reaction zone and said secondary column reactor in a total amount at least equivalent to that theoretically required to convert said primary amines into the corresponding mono-, di- and polyisocyanates, respectively.

5. The method of continuously producing mono-, di- and polyisocyanates, which comprises continuously reacting phosgene with an inert organic solvent solution of a compound selected from the group consisting of a primary mono-, di- and polyamine in a primary reaction zone at a temperature in the range of about −20° C. to about 60° C. to produce an intermediate reaction product and continuously reacting said product with phosgene in a secondary column reactor at a temperature of about 80° C. to about 320° C. to form the corresponding isocyanate, said phosgene being employed in said primary reaction zone and secondary column reactor in a total amount substantially equivalent to that theoretically required to convert said primary amines into the corresponding mono-, di- and polyisocyanates, respectively.

6. The method of continuously producing mono-, di- and polyisocyanates in accordance with claim 5, which includes the additional step of subjecting the resulting reaction product to the action of an inert gas to remove hydrogen chloride and unreacted phosgene.

7. The method of continuously producing mono-, di- and polyisocyanates in accordance with claim 5, which includes the additional steps of treating the resulting product with an inert gas to remove hydrogen chloride and unreacted phosgene and then recovering the isocyanate in a substantially pure form by distillation.

8. The method of continuously producing mono-, di- and polyisocyanates, which comprises continuously reacting phosgene with a solution of a compound selected from the group consisting of a primary mono-, di- and polyamine in ortho dichlorobenzene in a primary reaction zone and at a temperature of about −20° C. to about 60° C. to produce an intermediate reaction product and continuously reacting said product with phosgene in a secondary column reactor at a temperature of about 80° C. to about 170° C. to form the corresponding isocyanate, said phosgene being employed in said primary reaction zone and secondary column reactor in a total amount substantially equivalent to that theoretically required to convert said primary amines into the corresponding mono-, di- and polyisocyanates, respectively.

9. The method of continuously producing mono-, di- and polyisocyanates, which comprises continuously reacting phosgene with a solution of a compound selected from the group consisting of a primary mono-, di- and polyamine in chlorinated diphenyl (about 21% to about 62% by weight of chlorine) in a primary reaction zone and at a temperature of about −20° C. to about 60° C. to produce an intermediate reaction product and continuously reacting said product with phosgene in a secondary column reactor at a temperature of about 80° C. to about 320° C. to form the corresponding isocyanate, said phosgene being employed in said primary reaction zone and secondary column reactor in a total amount substantially equivalent to that theoretically required to convert said primary amines into the corresponding mono-, di- and polyisocyanates, respectively.

10. The method of continuously producing mono-, di- and polyisocyanates, which comprises continuously reacting phosgene with a solution of a compound selected from the group consisting of a primary mono-, di- and polyamine in a mixture of chlorinated isomeric terphenyls containing 42% chlorine in a primary reaction zone and at a temperature of about −20° C. to about 60° C. to produce an intermediate reaction product and continuously reacting said product with phosgene in a secondary column reactor at a temperature of about 80° C. to about 320° C. to form the corresponding isocyanate, said phosgene being employed in said primary reaction zone and secondary column reactor in a total amount substantially equivalent to that theoretically required to convert said primary amines into the corresponding mono-, di- and polyisocyanates, respectively.

11. The method of continuously producing mono-, di- and polyisocyanates, which comprises continuously reacting phosgene with a solution of a compound selected from the group consisting of a primary mono-, di- and polyamine in a partially hydrogenated mixture of terphenyls in a primary reaction zone and at a temperature of about −20° C. to about 60° C. to produce an intermediate reaction product and continuously reacting said product with phosgene in a secondary column reactor at a temperature of about 80° C. to about 320° C. to form the corresponding isocyanate, said phosgene being employed in said primary reaction zone and secondary column reactor in a total amount substantially equivalent to that theoretically required to convert said primary amines into the corresponding mono-, di- and polyisocyanates, respectively, and said hydrogenated mixture of terphenyls having a specific gravity within the range of about 0.950 to about 1.05 at 25° C.

12. The method of continuously producing meta-tolylene diisocyanate, which comprises continuously reacting phosgene with an inert organic solvent solution of meta-tolylene diamine in a primary reaction zone at a temperature of about −20° C. to about 60° C. to produce an intermediate reaction product and continuously reacting said product with phosgene in a secondary column reactor at a temperature of about 80° C. to about 320° C. to form the corresponding diisocyanate, said phosgene being employed in said primary reaction zone and secondary column reactor in a total amount substantially equivalent to that theoretically required to convert said primary amines into the corresponding mono-, di- and polyisocyanates, respectively.

13. The method of continuously producing meta-tolylene diisocyanate, which comprises continuously reacting phosgene with a solution of meta-tolylene diamine in ortho dichlorobenzene in a primary reaction zone and at a temperature of about −20° C. to about 60° C. to produce an intermediate reaction product and continuously reacting said product with phosgene in a secondary column reactor at a temperature of about 130° C. to about 170° C. to form the corresponding diisocyanate, said phosgene being employed in said primary reaction zone and secondary column reactor in a total amount substantially equivalent to that theoretically required to convert said primary amines into the corresponding mono-, di- and polyisocyanates, respectively.

14. The method of continuously producing meta-tolylene diisocyanate, which comprises continuously reacting phosgene with a solution of meta-tolylene diamine in chlorinated biphenyl (42% chlorine) in a primary reaction zone and at a temperature of about −20° C. to about 60° C. to produce an intermediate reaction product and continuously reacting said product with phosgene in a secondary column reactor at a temperature of about 130° C. to about 220° C. to form the corresponding diisocyanate, said phosgene being employed in said primary reaction zone and secondary column reactor in a total amount substantially equivalent to that theoretically required to convert said primary amines into the corresponding mono-, di- and polyisocyanates, respectively.

15. The method of continuously producing mono-, di- and polyisocyanates, which comprises continuously supplying phosgene and an inert organic solvent solution of a compound selected from the group consisting of a primary mono-, di- and polyamine to a primary reaction zone of a single column reactor and therein continuously reacting said phosgene and said amine at a temperature in the range of about −20° C. to about 60° C. to produce an intermediate reaction product and continuously conducting said product into a secondary reaction zone in said column and therein reacting said product with phosgene at a temperature of about 80° C. to about 320° C. to form the corresponding isocyanate, said phosgene being employed in said primary and secondary reaction zones in a total amount substantially equivalent to that theoretically required to convert said primary amines into the corresponding mono-, di- and polyisocyanates, respectively.

16. The method of continuously producing mono-, di- and polyisocyanates, which comprises continuously reacting phosgene with an inert organic solvent solution of a compound selected from the group consisting of a primary mono-, di- and polyamine in a primary reaction zone of a single column reactor and at a temperature of about −20° C. to about 60° C. to produce an intermediate reaction product and continuously conducting said product into a secondary reaction zone in said reactor and therein continuously reacting said product with phosgene at a temperature of about 80° C. to about 320° C. to form the corresponding isocyanate, said phosgene being employed in said primary and secondary reaction zones in a total amount substantially equivalent to that theoretically required to convert said primary amines into the corresponding mono-, di- and polyisocyanates, respectively.

17. The method of continuously producing mono-, di- and polyisocyanates, which comprises continuously reacting phosgene with an inert organic solvent solution of a compound selected from the group consisting of a primary mono-, di- and polyamine in a primary reaction zone of a single column reactor and at a temperature of about −20° C. to about 60° C. to produce an intermediate reaction product and continuously conducting said product into a secondary reaction zone in said reactor and therein continuously reacting said product with phosgene at a temperature of about 130° C. to about 200° C. to form the corresponding isocyanate, said phosgene being employed in said primary and secondary reaction zones in a total amount substantially equivalent to that theoretically required to convert said primary amines into the corresponding mono-, di- and polyisocyanates, respectively.

18. The method of continuously producing mono-, di- and polyisocyanates in accordance with claim 17, which includes the additional step of subjecting the resulting product to treatment with an inert gas to remove unreacted phosgene and hydrogen chloride.

19. The method of continuously producing mono-, di- and polyisocyanates in accordance with claim 17, which includes the additional steps of treating the resulting isocyanate product with an inert gas to remove unreacted phosgene and hydrogen chloride and recovering said isocyanate in a substantially pure form by distillation.

20. The method of continuously producing diisocyanates, which comprises continuously reacting phosgene with an inert organic solvent solution of a primary diamine in a primary reaction zone at a temperature in the range of about −20° C. to about 60° C. to produce an intermediate reaction product and continuously reacting said product with phosgene in a secondary column reactor at a temperature of about 80° C. to about 320° C. to form the corresponding diisocyanate, said phosgene being employed in said primary reaction zone and in said secondary column reactor in a total amount equivalent to an overall phosgene/amine molar ratio of at least 2:1.

21. The method of continuously producing diisocyanates, which comprises continuously supplying phosgene and an inert organic solvent solution of a primary diamine to a primary reaction zone of a single column reactor and therein continuously reacting said phosgene and said amine at a temperature in the range of about −20° C. to about 60° C. to produce an intermediate reaction product and continuously conducting said product into a secondary reaction zone in said column and therein continuously reacting said product with phosgene at a temperature of about 80° C. to about 320° C. to form the corresponding diisocyanate, said phosgene being employed in said primary and secondary reaction zones in a total amount equivalent to an overall phosgene/amine molar ratio of at least 2:1.

References Cited in the file of this patent

UNITED STATES PATENTS

| Number | Name | Date |
|---|---|---|
| 2,326,501 | Siefken et al. | Aug. 10, 1943 |

OTHER REFERENCES

De Bell et al., "German Plastics Practice," pages 300–4 (1946).